(12) United States Patent
Park

(10) Patent No.: US 7,728,494 B2
(45) Date of Patent: Jun. 1, 2010

(54) LIGHT EMISSION DEVICE AND DISPLAY DEVICE

(75) Inventor: Sang-Hun Park, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 247 days.

(21) Appl. No.: 11/843,563

(22) Filed: Aug. 22, 2007

(65) Prior Publication Data

US 2008/0116809 A1 May 22, 2008

(30) Foreign Application Priority Data

Nov. 20, 2006 (KR) ...................... 10-2006-0114615

(51) Int. Cl.
*H01J 1/02* (2006.01)
*H01J 9/02* (2006.01)
*H01J 63/04* (2006.01)
*H05B 41/36* (2006.01)

(52) U.S. Cl. ............................. 313/37; 313/39; 313/45; 313/46; 313/47; 313/310; 313/495; 313/496; 313/497; 315/106

(58) Field of Classification Search ............. 313/37–38, 313/45–47, 309–310, 495–497; 315/116
See application file for complete search history.

(56) References Cited

U.S. PATENT DOCUMENTS

| 5,587,623 A | * | 12/1996 | Jones .......................... 313/497 |
| 2005/0200447 A1 | * | 9/2005 | Chandler et al. ............... 338/25 |
| 2007/0024545 A1 | * | 2/2007 | Cho et al. ...................... 345/76 |
| 2007/0069235 A1 | * | 3/2007 | Ueno et al. .................. 257/109 |

* cited by examiner

*Primary Examiner*—Karabi Guharay
*Assistant Examiner*—Sheryl Hull
(74) *Attorney, Agent, or Firm*—Christie, Parker & Hale, LLP

(57) ABSTRACT

A light emission device and a display device having the light emission device are provided. The light emission device includes first and second substrates that are arranged to face each other, an electron emission unit that is located on a first surface of the first substrate facing the second substrate and has electron emission regions and driving electrodes, a light emission unit that is located on a surface of the second substrate and has an anode electrode and one or more phosphor layers, and a surface heat generation unit that is located on a second surface (or outer surface) of the first substrate facing away from the second substrate to control a temperature of the first substrate using a resistive layer having a positive temperature coefficient (PTC) property.

20 Claims, 8 Drawing Sheets

LIGHT EMISSION DEVICE AND DISPLAY DEVICE

CROSS-REFERENCE TO RELATED APPLICATION

This application claims priority to and the benefit of Korean Patent Application No. 10-2006-0114615, filed on Nov. 20, 2006, in the Korean Intellectual Property Office, the entire content of which is incorporated herein by reference.

BACKGROUND OF THE INVENTION

1. Field of the Invention

The present invention relates to a light emission device that is designed to control a temperature of a rear substrate on which electron emission regions are located. The present invention further relates to a display device using the light emission device as a light source.

2. Description of Related Art

Devices that can emit light to an external side can be referred to as light emission devices. One type of light emission devices includes a rear substrate on which electron emission regions and driving electrodes are formed, and a front substrate on which an anode electrode and a phosphor layer are formed. This light emission device emits visible light by exciting the phosphor layer using electrons emitted from the electron emission regions.

In more detail, the light emission device is operated by i) controlling an amount of electrons emitted from the electron emission regions by applying driving voltages (scan and data driving voltages) to the driving electrodes and ii) accelerating the electrons emitted from the electron emission regions toward the phosphor layer by applying a positive direct current voltage (anode voltage) of hundreds to thousands of volts to the anode electrode.

The light emission device may be used as a light source for emitting light to a passive type display panel of a display device.

In an initial driving state of the light emission device or when the light emission device is driven under a low temperature environment, electron emission cannot be sufficiently realized due to the rear substrate being in a low temperature state. That is, it takes a relatively long time to increase an emission amount of electrons to a proper level with a certain (or predetermined) driving voltage to thus stabilize the electron emission property.

Furthermore, when the light emission device is being driven, there may be a temperature difference between the front and rear substrates. This temperature difference may cause cracks to be generated on and/or in the substrates, thereby deteriorating lifespan and reliability of the light emission device. The temperature difference also adversely affects the spacers arranged between the front and rear substrates by varying a surface potential of the spacers, thereby deteriorating an electron beam path around the spacers.

SUMMARY OF THE INVENTION

Aspects of embodiments of the present invention are directed to a light emission device that includes front and rear substrates and is capable of quickly increasing electron emission efficiency and/or reducing a temperature difference between the front and rear substrates in an initial driving period of the light emission device and/or when the light emission device is driven under a low temperature environment. Other aspects of embodiments of the present invention are directed to a display device using the light emission device as a light source.

In an exemplary embodiment of the present invention, a light emission device includes first and second substrates that are arranged to face each other, an electron emission unit that is located on a first surface (or an inner surface) of the first substrate facing the second substrate and has electron emission regions and driving electrodes, a light emission unit that is located on a surface (or an inner surface) of the second substrate and has an anode electrode and one or more phosphor layers, and a surface heat generation unit that is located on a second surface (or outer surface) of the first substrate facing away from the second substrate to control a temperature of the first substrate using a resistive layer having a positive temperature coefficient (PTC) property.

The surface heat generation unit may include a case having an upper plate, a lower plate, and a side plate, positive and negative lead lines located on at least one of a surface of the upper plate facing the lower plate or a surface of the lower plate facing the upper plate, and a PTC resistive layer located in the case. The upper plate may contact the first substrate and be formed of a metal plate. The lower plate and the side plate may be formed of a ductile insulation material (or an insulation material having a relatively high ductility).

The positive and negative lead lines may be located between the driving electrodes in a parallel manner. The positive lead line may include first lead lines arranged in parallel with each other and second lead lines extending perpendicularly from the first lead lines. The negative lead line may include third lead liens arranged in parallel with each other and fourth lead lines extending perpendicularly from the third lead lines. Here, the first and third lead lines may be alternately arranged in a first direction of the first substrate and the second and fourth lead lines may be alternately arranged in a second direction of the first substrate.

The surface heat generation unit may further include a temperature detecting portion for detecting temperatures of the first and second substrates and a control portion for applying voltages to the positive and negative lead lines in accordance with temperature information of the temperature detecting portion.

The PTC resistive layer may have a varying thickness depending on a position thereof. That is, in one embodiment, the thickness of the PTC resistive layer varies along a length extending in a direction parallel with one of the driving electrodes or the thickness of the PTC resistive layer varies from a central portion of the first substrate to a peripheral portion of the first substrate.

The driving electrodes may include cathode electrodes and gate electrodes crossing the cathode electrodes with an insulation layer interposed between the cathode electrodes and the gate electrodes, and the electron emission regions are electrically connected to the cathode electrodes. The phosphor layers may include red, green, and blue phosphor layers spaced apart from each other. In this case, the light emission unit may further include a black layer located between the phosphor layers. Alternatively, the phosphor layer may emit white light.

In another exemplary embodiment of the present invention, a display device includes a display panel for displaying an image and a light emission device emitting light toward the display panel, wherein the light emission device includes first and second substrates that are arranged to face each other, an electron emission unit that is located on a first surface (or an inner surface) of the first substrate facing the second substrate and has electron emission regions and driving electrodes, a light emission unit that is located on a surface (or an inner surface) of the second substrate and has an anode electrode and one or more phosphor layers, and a surface heat generation unit that is located on a second surface (or outer surface) of the first substrate facing away from the second substrate to control a temperature of the first substrate using a resistive layer having a positive temperature coefficient (PTC) property.

The display panel has first pixels and the light emission device has second pixels. Here, in one embodiment, a number of the second pixel is less than a number of the first pixels and an intensity of a light emission of each of the second pixels is independently controlled. The display panel may be a liquid crystal panel.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE EMBODIMENTS

Figure 1:
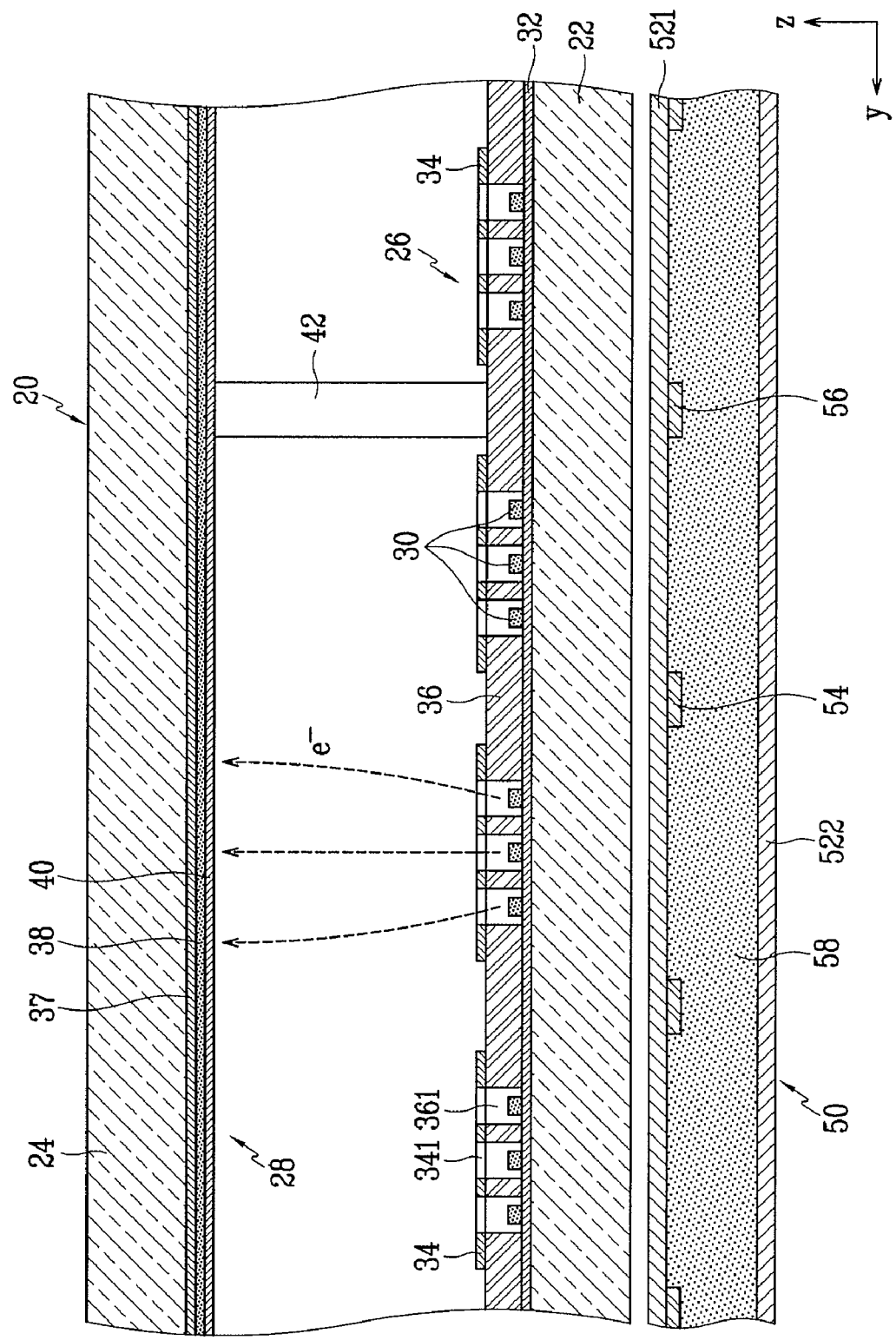
FIG. 1 is a partial sectional view of a light emission device according to an exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

In exemplary embodiments of the present invention, devices that emit light to an external side are referred to as light emission devices. Therefore, display devices that transmit information by displaying symbols, letters, numbers, and/or images can be referred to as light emission devices. In one embodiment, the light emission device may be used as a light source for providing light to a passive type display panel.

FIG. 1 is a partial sectional view of a light emission device according to an exemplary embodiment of the present invention.

Referring to FIG. 1, a light emission device 10 includes a light emission panel 20 having first and second substrates 22 and 24 facing each other in parallel with an interval therebetween (wherein the interval may be predetermined). A sealing member is provided between peripheries (or periphery portions) of the first and second substrates 22 and 24 to seal them together. The interior of the light emission panel 20 is kept to a degree of vacuum of about $10^{-6}$ Torr.

Inside the interior sealed by the sealing member, each of the first and second substrates 22 and 24 may be divided into an active area from which visible light is actually emitted and an inactive area surrounding the active area. An electron emission unit 26 for emitting electrons is provided on a surface (or an inner surface) of the first substrate 22 facing the second substrate 24 at the active area. A light emission unit 28 for emitting the visible light is provided on a surface (or an inner surface) of the second substrate 24 facing the first substrate 22 at the active area.

The second substrate 24 on which the light emission unit 28 is located becomes a front substrate of the light emission panel 20 and the first substrate 22 on which the electron emission unit 26 is located becomes a rear substrate of the light emission panel 20. A surface heat generation unit 50 with a resistive layer having a positive temperature coefficient (PTC) property is located on a surface (or an outer surface) of the first substrate 22 facing away (or oppositely) from the second substrate 24.

The electron emission unit 26 includes electron emission regions 30 and driving electrodes 32 and 34 for controlling an electron emission of the electron emission regions 30. The driving electrodes include cathode electrodes 32 and gate electrodes 34. The cathode electrodes 32 cross the gate electrodes 34 with an insulation layer 36 interposed between the cathode electrodes 32 and the gate electrodes 34.

Openings 341 and openings 361 are respectively formed in the gate electrodes 34 and the insulation layer 36 at each region where the cathode and gate electrodes 32 and 34 cross each other. The electron emission regions 30 are located on the cathode electrodes 32 in the openings 361 of the insulation layer 36.

The electron emission regions 30 are formed of a material for emitting electrons when an electric field is formed around thereof under a vacuum atmosphere, such as a carbon-based material and/or a nanometer-sized material. For example, the electron emission regions 30 may include at least one of materials selected from the group consisting of carbon nanotubes, graphite, graphite nanofibers, diamonds, diamond-like carbon, fullerene $C_{60}$, silicon nanowires, and combinations thereof. Alternatively, the electron emission regions may be formed to have a sharp tip structure made of a molybdenum-based material and/or a silicon-based material.

In the above-described structure, each of regions where the cathode electrodes 32 cross the gate electrodes 34 corresponds to a single pixel region of the light emission device 10.

Alternatively, two or more of the crossing regions may correspond to the single pixel region. In latter case, two or more of the cathode electrodes 32 and/or two or more of the gate electrodes 34, which correspond to the single pixel region, are electrically connected to each other to be applied with a common driving voltage.

The light emission unit 28 includes an anode electrode 37, a phosphor layer 38 located on a surface of the anode electrode 37, and a reflection layer 40 covering the phosphor layer 38. The anode electrode 37 is an acceleration electrode that receives a high voltage to place the phosphor layer 38 at a high potential state. In one embodiment, the anode electrode 37 is formed by a transparent conductive material, such as ITO (indium tin oxide).

The reflection layer 40 may be an aluminum layer having a thickness of about several thousands of angstroms (Å) and a plurality of holes (or relatively tiny holes) for passing the electrons through. The reflection layer 40 may function to enhance the screen luminance by reflecting visible light, which is emitted from the phosphor layer 38 toward the first substrate 22, back to the second substrate 24. In one embodiment, the anode electrode 37 formed by the transparent conductive material can be eliminated, and the reflection layer 40 can function as the anode electrode.

Disposed between the first and second substrates 22 and 24 are spacers 42 that are able to withstand compression force applied to the light emission panel 20 and to maintain a uniform gap between the first and second substrates 22 and 24.

The light emission panel 20 is driven when driving voltages (that may be predetermined) are applied to the cathode and gate electrodes 32 and 34, and a positive direct current voltage (anode voltage) of thousands of volts or more is applied to the anode electrode 37. In one embodiment, the cathode electrodes 32 are applied with scan driving voltage, and the gate electrodes 34 are applied with data driving voltages. In another embodiment, the gate electrodes 34 are applied with scan driving voltage, and the cathode electrodes 32 are applied with data driving voltages.

Electric fields are formed around the electron emission regions 30 at the pixels where the voltage difference between the cathode and gate electrodes 32 and 34 is equal to or greater than the threshold value, and thus electrons are emitted from the electron emission regions 30. The emitted electrons collide with a corresponding portion of the phosphor layer 38 by being attracted by the high voltage applied to the anode electrode 37, thereby exciting the phosphor layer 38. A light emission intensity of the phosphor layer 38 for each pixel corresponds to an electron emission amount of the corresponding pixel.

In the light emission panel 20 that is driven as described above, an electron emission amount of each electron emission region 30 is affected by an ambient temperature, i.e., a temperature of the first substrate 22, and an electron emission efficiency is proportional to the temperature of the first substrate 22. In the present exemplary embodiment, the surface heat generation unit 50 increases the temperature of the first substrate 22 by operating in an initial driving period of the light emission panel 20 or when the light emission panel 20 is driven under a low temperature environment.

Figure 2:
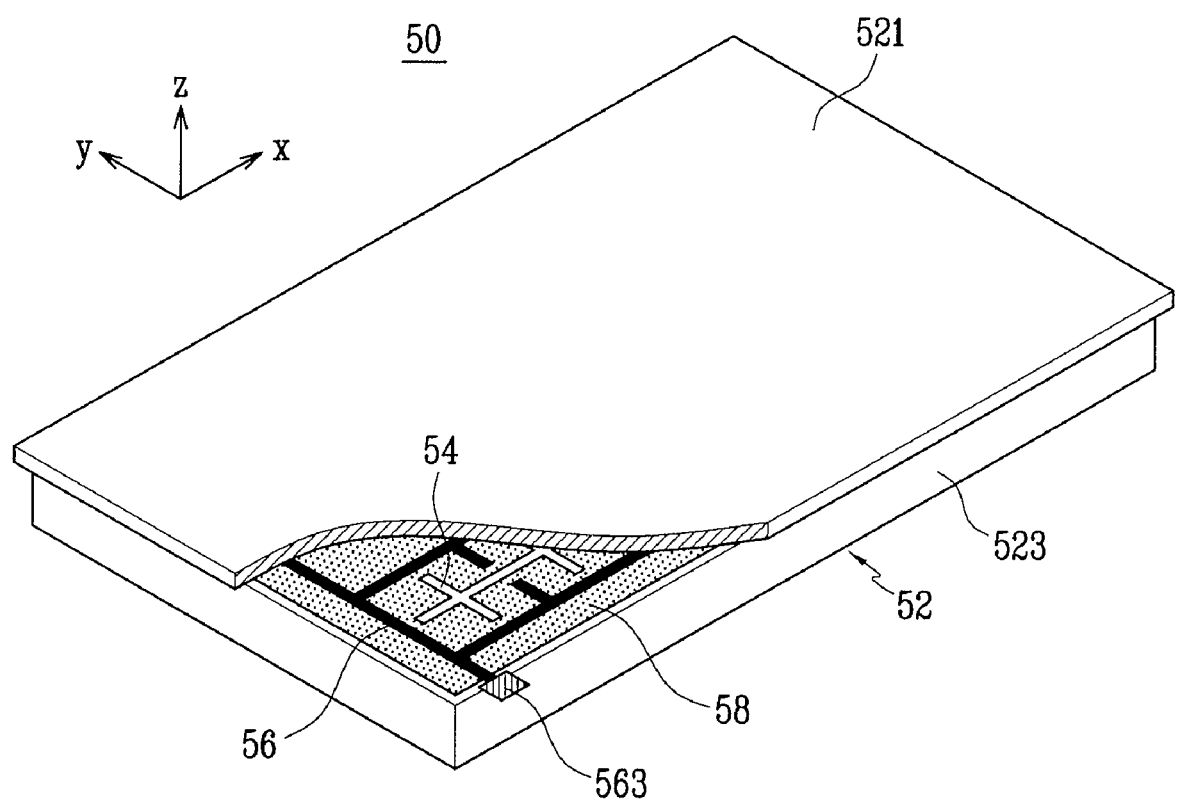
FIG. 2 is a partially cut-away exploded perspective view of a surface heat generation unit of the light emission device of FIG. 1.
Figure 3:
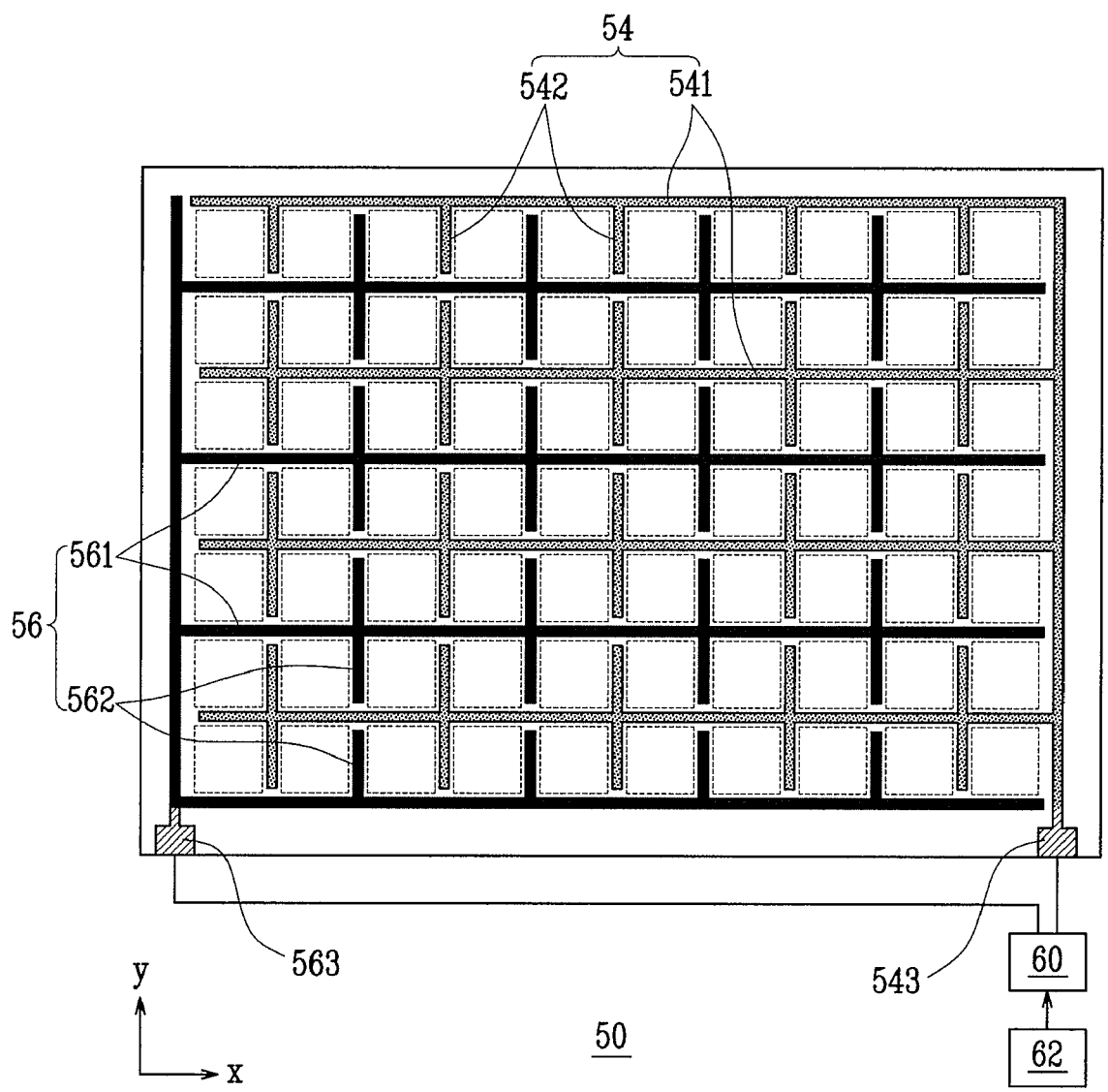
FIG. 3 is a top plan schematic view of positive and negative lead lines of the surface heat generation unit depicted in FIG. 2.

FIG. 2 is a partial cut-away perspective view of the surface heat generation unit and FIG. 3 is a top plan schematic view of positive and negative lead lines of the surface heat generation unit.

Referring to FIGS. 1 through 3, the surface heat generation unit 50 includes a case 52 having an upper plate 521, a lower plate 522, and a side plate 523, positive and negative lead lines 54 and 56 located on one of inner surfaces of the upper and lower plates 521 and 522 (e.g., an inner surface of the upper plate 521 facing the lower plate 522 in the drawing), and a PTC resistive layer 58 located in the case 52.

The upper plate 521 contacts a surface (or a rear surface) of the first substrate 22, and a circuit board assembly for driving the light emission panel 20 is located on a surface (or a rear surface) of the lower plate 522 of the surface heat generation unit 50.

The upper plate 521 may be formed of a metal plate having a relatively high thermal conductivity. In this case, heat of the surface heat generation unit 50 can be quickly transferred to the first substrate 22. In the event that the heat is concentrated (or condensed) on the first substrate 22 due to the overload of the electron emission unit 26, the heat of the first substrate 22 can be quickly dissipated to an external side of the light emission device 10 through the upper plate 521, thereby protecting the light emission device 10 from explosion. That is, the surface heat generation unit 50 also has a safety function.

Also, in one embodiment, the side plate 523 and the lower plate 522 facing the circuit board assembly are formed of an insulation material such as rubber having a relatively high ductility. In this embodiment, when an external impact is applied to the light emission device 10, the lower plate 522 and the side plate 523 absorb the impact to thereby suppress the damage of the circuit board assembly. The lower plate 522 may be integrally formed with the side plate 523.

The PTC resistive layer 58 may be formed of a material having a PTC property in which the resistance increases as the temperature increases. The material for the PTC resistive layer 58 may include $BaTiO_3$ and a small amount of a rare-earth element. The PTC resistive layer 58 increases the resistance when the temperature of the PTC resistive layer is at or higher than the Curie temperature (or Curie point ($T_c$)) to thus stop the generation of heat, thereby reducing (or preventing) a risk of the fire.

The positive and negative lead lines 54, 56 are arranged between the driving electrodes 32, 34 in parallel with the driving electrodes 32, 34. In one embodiment as described and shown in more detail below, the positive and negative lead lines 54, 56 have an arrangement structure for enlarging a contact area with the PTC resistive layer 58 to thereby increase the heat generation efficiency of the PTC resistive layer 58.

In more detail, as shown in FIG. 3, the positive lead line 54 includes first lead lines 541 arranged in parallel with each other and second lead lines 542 perpendicularly extending from the first lead lines 541. Likewise, the negative lead line 56 includes third lead lines 561 arranged in parallel with each other and fourth lead lines 562 perpendicularly extending from the third lead lines 561.

Here, the first and third lead lines 541 and 561 may be alternately (and periodically) arranged in a first direction (a y-axis in FIG. 3) of the first substrate 22 while the second and fourth lead lines 542 and 562 may be alternately (and periodically) arranged in a second direction (an x-axis in FIG. 3) of the first substrate 22. In more detail, a pair of the first and third lead lines 541 and 561 may be located to define a single pixel region interposed therebetween in the first direction of the first substrate 22, and a pair of the second and fourth lead lines 542 and 562 may be located to define the same single pixel region interposed therebetween in the second direction of the first substrate 22.

In FIG. 3, the pixel regions of the light emission device are illustrated by dotted squares. The reference number 543 indicates a positive pad extending from the positive lead line 54, and the reference number 563 indicates a negative pad extending from the negative lead line 56.

The above-described surface heat generation unit 50 is driven by being applied with a voltage (that may be predetermined) through the positive and negative pads 543 and 563 in the initial driving period of the light emission panel 20 or when the light emission panel 20 operates under the low temperature environment. Then, the temperature of the PTC resistive layer 58 increases and thus the surface heat generation unit 50 generates the heat, thereby increasing the temperature of the first substrate 22 and thus improving the electron emission efficiency of the electron emission regions 30.

The surface heat generation unit 50 of the present exemplary embodiment reduces a temperature difference between the first and second substrates 22 and 24 during driving of the light emission panel 20, thereby suppressing the generation of cracks of the substrates 22 and 24. As a result, the endurance and reliability of the light emission device 10 can be improved. Furthermore, the reduction of the temperature difference between the first and second substrates 22 and 24 allows the surface potential of the spacer 42 to be uniform along a height of the spacer 42 and reduces or minimizes the distortion of an electron beam path around the spacer 42.

During driving of the light emission device 10, the above-described surface heat generation unit 50 can automatically control when it is on and when it is off by utilizing temperature information of the first and second substrates 22 and 24. In order to achieve this automation, the surface heat generation unit 50 further includes a temperature detecting portion 60 for detecting temperatures of the first and second substrates 22 and 24 and a control portion 62 for controlling a power connection of the positive and negative pads 543 and 563 in accordance with the temperature information of the temperature detecting portion 60. In this case, the light emission device 10 of the present exemplary embodiment maintains (or optimally maintains) a driving state of the light emission panel 20 even in the initial driving period.

Figure 4:
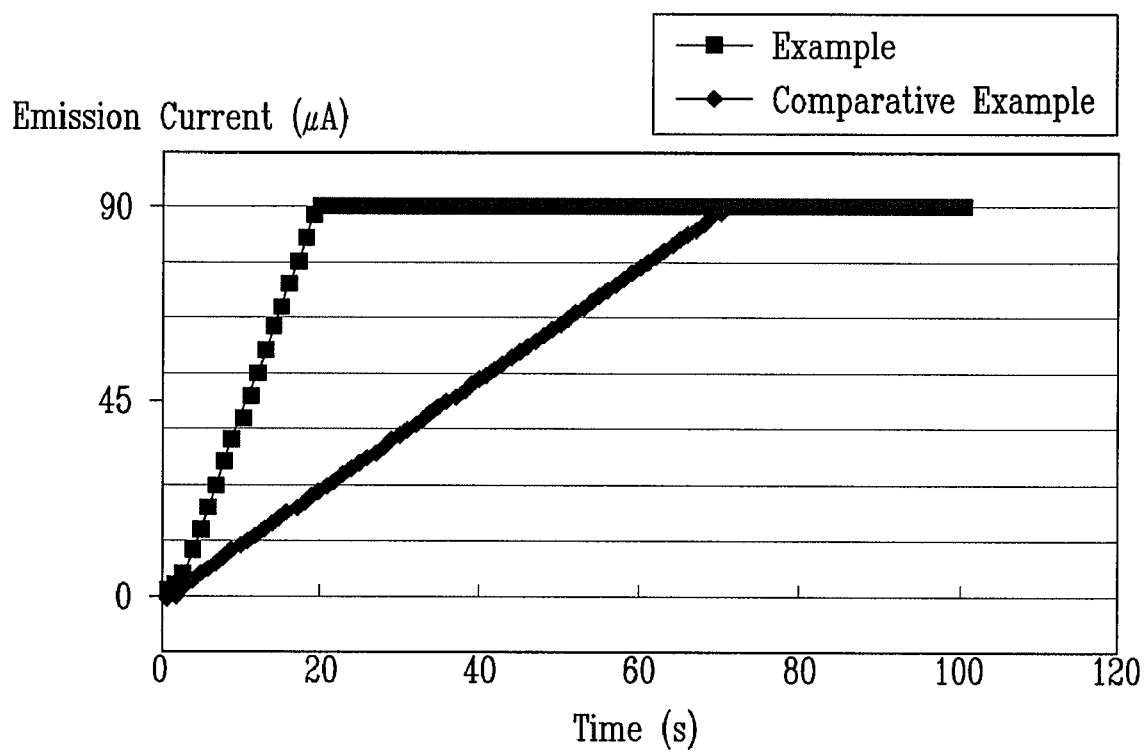
FIG. 4 is a graph illustrating a variation of an amount of an emission current in accordance with a driving time in a light emission device of an exemplary embodiment and a light emission device of a comparative example.

FIG. 4 is a graph illustrating a variation of an amount of an emission current in accordance with a driving time in the light emission device having the surface heat generation unit according to the exemplary embodiment and a light emission device not having the surface heat generation unit according to a comparative example. The light emission panel of the light emission device of the exemplary embodiment has an identical (or substantially identical) structure to that of the light emission device of the comparative example. Each of the light emission devices of the exemplary embodiment and the comparative example was driven by applying voltages of 50V, 100V and 10 kV to the cathode, gate and anode electrodes, respectively.

Referring to FIG. 4, in the light emission device of the comparative example, an amount of the emission current is stabilized to 90 μA after about 70 seconds has elapsed. In the light emission device of the present exemplary embodiment, an amount of the emission current is stabilized to 90 μA after about 20 seconds has elapsed.

Therefore, it can be noted that the light emission device having the surface heat generation unit according to the present exemplary embodiment can quickly increase the electron emission efficiency of the electron emission regions and stabilize the electron emission property in the initial driving period.

Also, in the light emission panel 20, a luminance difference may occur along a length of one of the driving electrodes 32 and 34 or between a central portion and a peripheral portion of the light emission surface due to an internal resistance of the driving electrodes 32 and 34 or other reasons. Here, the luminance difference can be compensated for by increasing a thickness of the PTC resistive layer 58 at a portion where a light emission luminance is low.

Figure 5:
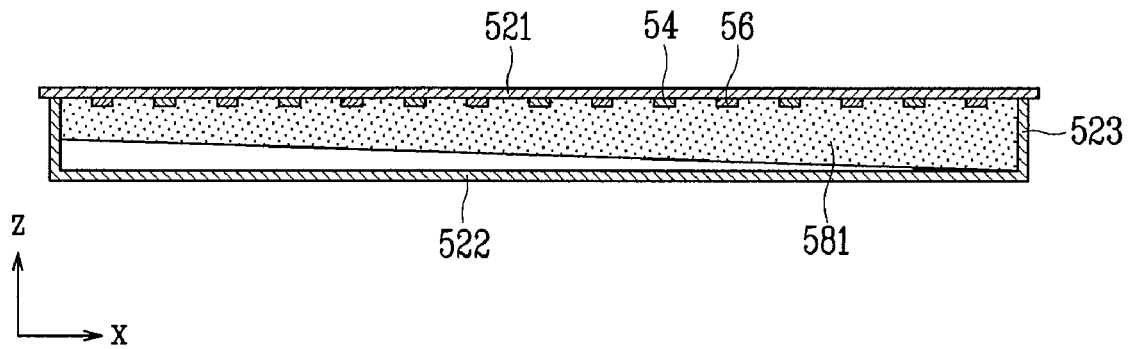
FIG. 5 is a sectional view of a surface heat generation unit according to a second exemplary embodiment of the present invention.

FIG. 5 is a sectional view of a surface heat generation unit according to a second embodiment of the present invention. Referring to FIG. 5, when the luminance variation occurs along a length (an x-axis in FIG. 5) of one of the driving electrodes, the PTC resistive layer 581 is designed having a thickness that varies along the length of the driving electrode; i.e., the PTC resistive layer 581 is thicker at a portion where the luminance is low.

Figure 6:
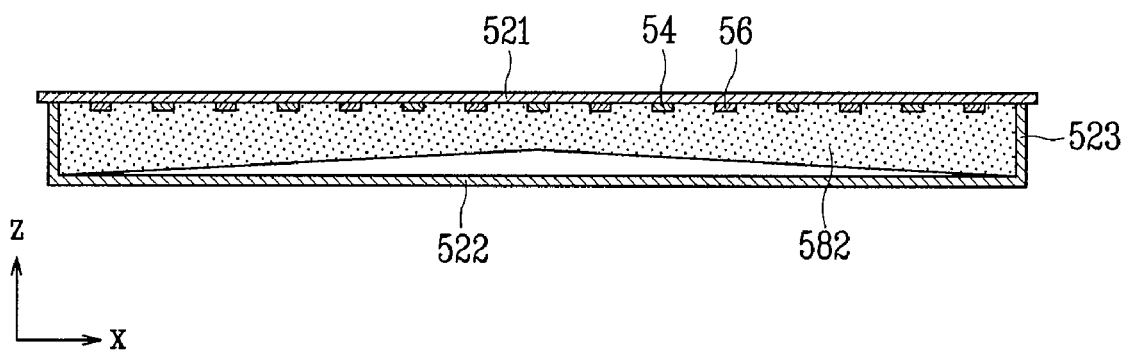
FIG. 6 is a sectional view of a surface heat generation unit according to a third exemplary embodiment of the present invention.

FIG. 6 is a sectional view of a surface heat generation unit according to a third embodiment of the present invention. Referring to FIG. 6, when the light emission luminance is gradually lowered toward the peripheral portion from the central portion of the light emission surface, a thickness of the PTC resistive layer 582 increases gradually from the central portion toward the peripheral portion.

Figure 7:
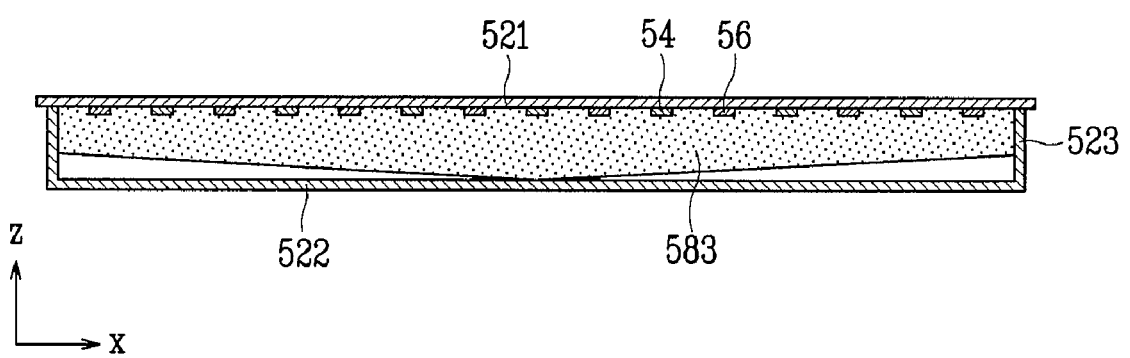
FIG. 7 is a sectional view of a surface heat generation unit according to a fourth exemplary embodiment of the present invention.

FIG. 7 is a sectional view of a surface heat generation unit according to a fourth embodiment of the present invention. Referring to FIG. 7, when the light emission luminance is gradually lowered toward the central portion from the peripheral portion of the light emission surface, a thickness of the PTC resistive layer 583 increases gradually from the peripheral portion toward the central portion.

As described above, the PTC resistive layers 581, 582, 583 are formed to be thicker at a portion where the light emission luminance is low and thus the electron emission efficiency at the portion where the light emission luminance is low increases during the operation of the light emission panel 20. As a result, a luminance irregularity of the light emission surface can be reduced.

The light emission device 10 may be used as a display device (by itself) by being provided with red, green, and blue phosphor layers or as a light source for providing white light to a passive type display panel.

Figure 8:
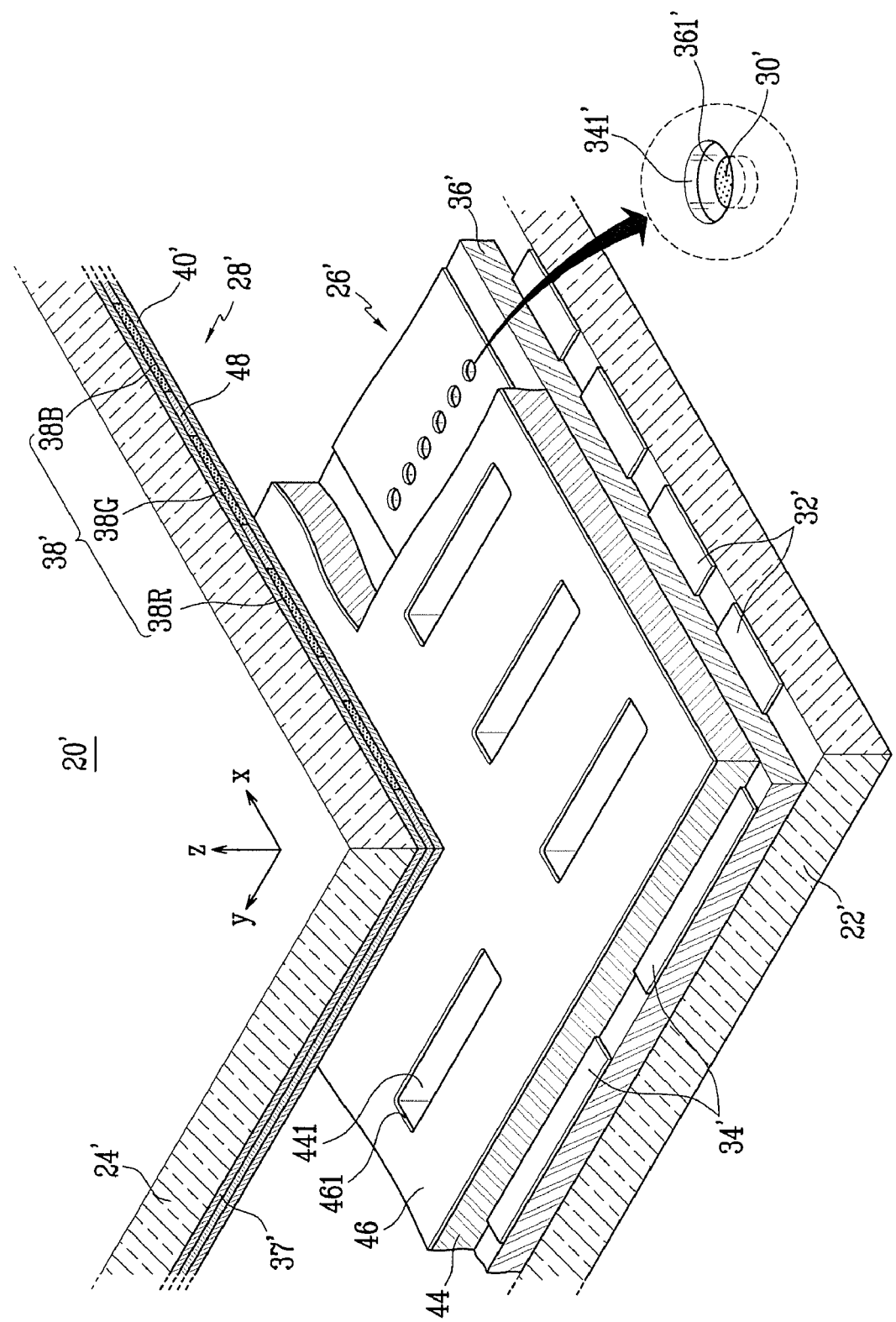
FIG. 8 is a partial cut-away perspective view of a light emission panel that is designed as a display device according to an exemplary embodiment of the present invention.
Figure 9:
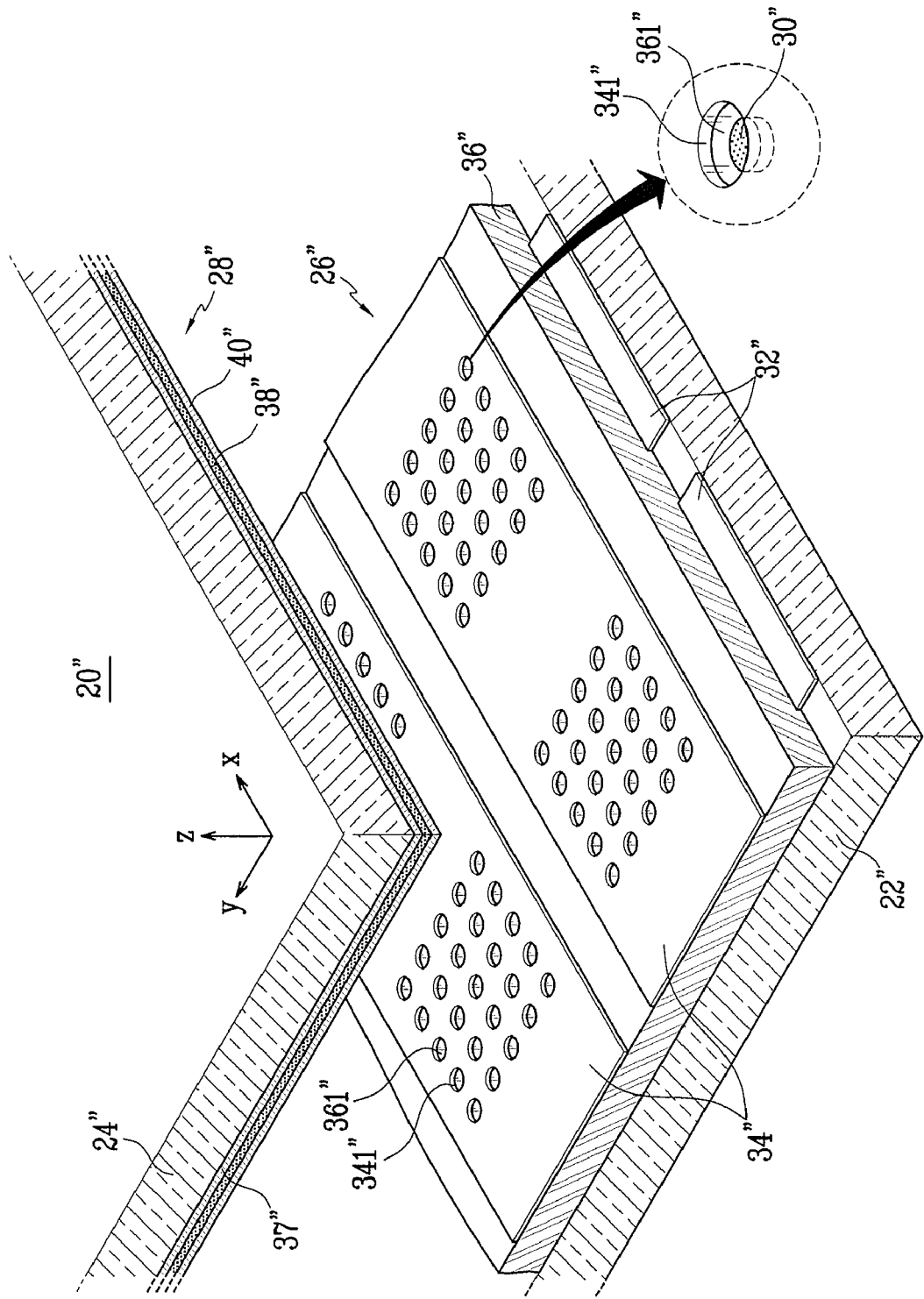
FIG. 9 is a partial cut-away perspective view of a light emission panel that is designed as a light source according to an exemplary embodiment of the present invention.

FIG. 8 is a partial cut-away perspective view of a light emission panel that can function as a display device (by itself), and FIG. 9 is a partial cut-away perspective view of a light emission panel that can be used as a light source.

Referring to FIG. 8, in a light emission panel 20' that is designed as a display device (by itself), an electron emission unit 26' (on a first substrate 22') includes cathode electrodes 32', gate electrodes 34', and electron emission regions 30' electrically connected to the cathode electrodes 32'. When an insulation layer 36' located between the cathode electrodes 32' and the gate electrodes 34' is referred to as a first insulation layer, a second insulation layer 44 may be formed on the first insulation layer 36' while covering the gate electrodes 34' and a focusing electrode 46 may be formed on the second insulation layer 44. Openings 341' and openings 361' are respectively formed in the gate electrodes 34' and the insulation layer 36'.

In addition, openings 441 and openings 461 are respectively formed in the second insulation layer 44 and the focusing electrode 46. The focusing electrode 46 allows the electrons passing through the openings 461 to converge on a center of a bundle of electron beams by being applied with 0V or a negative direct current voltage from several to tens of volts.

A light emission unit 28' (on a second substrate 24') includes an anode electrode 37', phosphor layers 38' such as red, green, and blue phosphor layers 38R, 38G, and 38B that are spaced apart from each other, a black layer 48 that is located between the phosphor layers 38' to increase the screen contrast, and a reflection layer 40' located on surfaces of the phosphor layers 38' and the black layer 48.

The red, green, and blue phosphor layers 38R, 38G, and 38B are arranged to correspond to respective regions where the cathode electrodes 32' cross the gate electrodes 34', thereby defining respective sub-pixels. Three sub-pixels, i.e., the red, green, and blue phosphor layers 38R, 38G, and 38B that are located side by side, define a single pixel.

Referring to FIG. 9, in a light emission panel 20" that is designed as a light source, an electron emission unit 26" includes cathode electrodes 32", gate electrodes 34", and electron emission regions 30" electrically connected to the cathode electrodes 32". An insulation layer 36" is located between the cathode electrodes 32" and the gate electrodes 34". Openings 341" and openings 361" are respectively formed in the gate electrodes 34" and the insulation layer 36".

A light emission unit 28" includes an anode electrode 37", a phosphor layer 38" for emitting white light and a reflection layer 40" located on a surface of the phosphor layer 38".

The phosphor layer 38" may be formed of a mixture of red, green, and blue phosphors to emit white light. The phosphor layer 38" may be formed on an entire active area of the second substrate 24" or in a pattern (that may be predetermined) having a plurality of sections corresponding to pixel regions.

In the light emission panel 20", the first and second substrates 22" and 24" are spaced apart from each other by a relatively large distance from about 5 to 20 mm. By enlarging the distance between the first and second substrates 22" and 24", arcing generation(s) in the light emission panel 20" can be reduced. The anode electrode 37" may be applied with a voltage of 10 kV or more, and, in one embodiment, is applied with a voltage from 10 to 15 kV. Accordingly, the above-described light emission panel 20" can realize a luminance of 10,000 cd/m$^2$ at a central portion of the active area.

Figure 10:
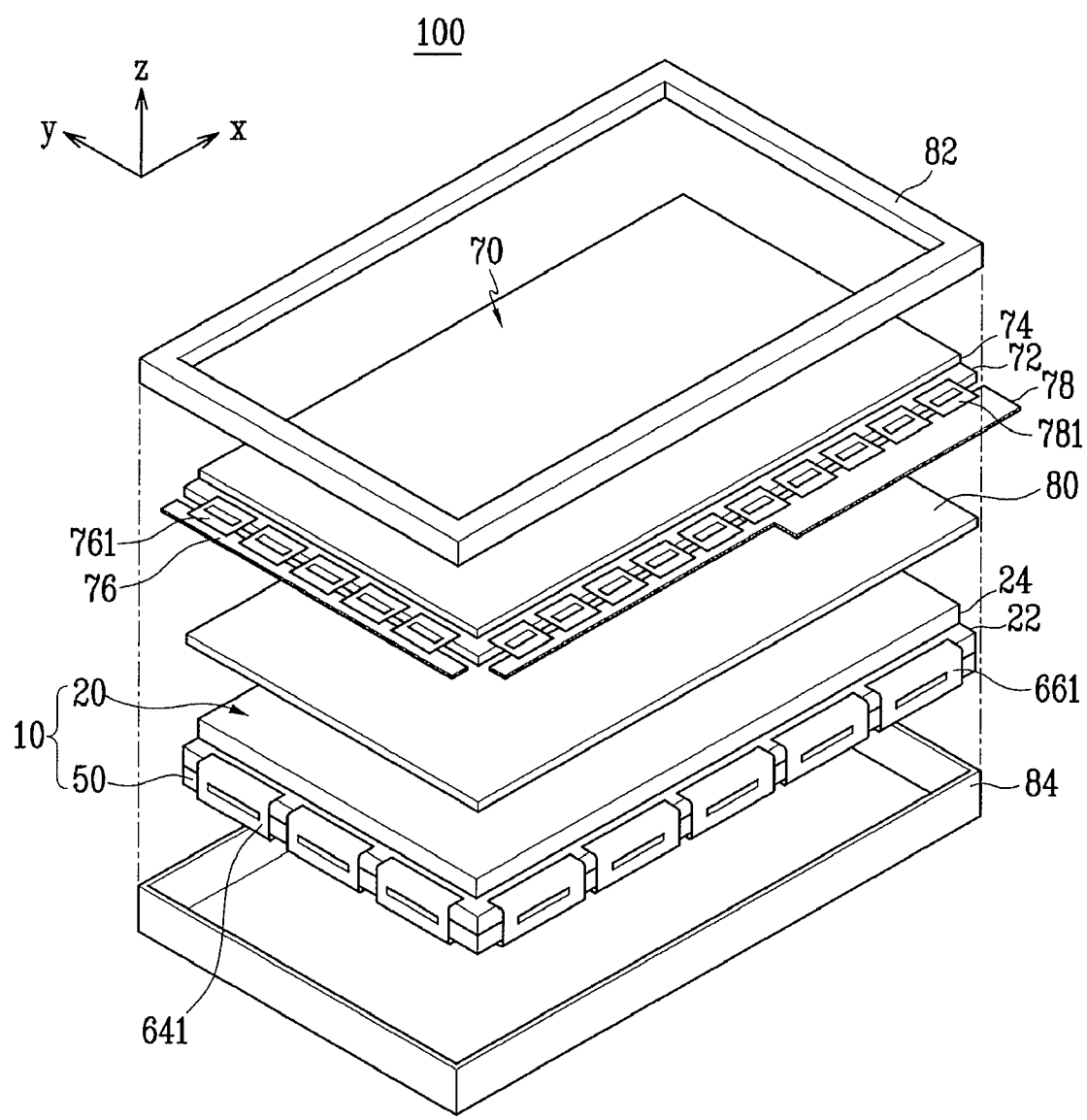
FIG. 10 is an exploded perspective view of a display device according to an exemplary embodiment of the present invention.

FIG. 10 is an exploded perspective view of a display device using an above described light emission device (e.g., the light emission device 10) as a light source according to an exemplary embodiment of the present invention. The display device illustrated in FIG. 10 with the light emission device 10 having the light emission panel 20 is provided as an example, but the present invention is not thereby limited (e.g., the display device may include light emission panel 20").

With reference to FIG. 10, a display device 100 includes a light emission device 10 and a display panel 70 located in front of the light emission device 10. The light emission device 10 includes a light emission panel 20 and a surface heat generation unit 50 that is located in rear of the light emission panel 20 to control a temperature of a first substrate 22.

A diffuser 80 for uniformly diffusing light emitted from the light emission device 10 to the display panel 70 may be located between the light emission device 10 and the display panel 70. The diffuser 80 is spaced apart from the light emission device 10 by a distance (that may be predetermined). A top chassis 82 is located in front of the display panel 70, and a bottom chassis 84 is located in rear of the light emission device 10.

A liquid crystal panel or other suitable passive type display panels may be used as the display panel 70. In the following description, a case where the display panel 70 is the liquid crystal panel will be explained as an example.

The display panel 70 includes a thin film transistor (TFT) panel 72 having a plurality of TFTs, a color filter panel 74 located above the TFT panel 72, and a liquid crystal layer formed between the panels 72 and 74. Polarizing plates are attached on a top surface of the color filter panel 74 and a bottom surface of the TFT panel 72 to polarize the light passing through the display panel 70.

Each of the TFTs has a source terminal connected to one or more data lines, a gate terminal connected to one or more gate lines, and a drain terminal connected to one or more pixel electrodes formed of a transparent conductive material. When an electric signal is input from circuit board assemblies 76 and 78 to the respective gate and data lines, the electric signal is input to the gate and source terminals of the TFT, and the TFT is turned on or off in accordance with the electric signal to output an electric signal required for driving the pixel electrodes to the drain terminal.

The color filter panel 74 is a panel on which RGB color filters for emitting colors when the light passes therethrough are formed. A common electrode formed of a transparent conductive material is formed on an entire surface of the color filter panel 74. When the TFT is turned on by applying electric power to the gate and source terminals, an electric field is formed between the pixel electrode and the common electrode. A twisting angle of liquid crystal molecular of the liquid crystal layer is varied, in accordance of which, the light transmittance of the corresponding pixel is varied.

The circuit board assemblies 76 and 78 of the display panel 70 are respectively connected to driving IC packages 761 and 781. In order to drive the display panel 70, the gate circuit board assembly 76 transmits a gate driving signal, and the data circuit board assembly 78 transmits a data driving signal.

The light emission panel 20 includes a plurality of pixels, the number of which is less than the number of pixels of the display panel 70 so that one pixel of the light emission panel 20 corresponds to two or more of the pixels of the display panel 70. Each pixel of the light emission panel 20 emits the light in response to a highest gray level among gray levels of the corresponding pixels of the display panel 70. The light emission panel 20 can represent gray levels in gray scale ranging from 2 to 8 bits at each pixel.

For convenience, the pixels of the display panel 70 are referred as first pixels and the pixels of the light emission panel 20 are referred as second pixels. The first pixels corresponding to one second pixel is referred as a first pixel group.

Describing a driving process of the light emission panel 20 in more detail, a signal control unit for controlling the display panel 70 detects the highest gray level of the first pixel group, operates a gray level required for emitting light from the second pixel in response to the detected high gray level, converts the operated gray level into digital data, and generates a driving signal of the light emission panel 20 using the digital data. The driving signal of the light emission panel 20 includes a scan driving signal and a data driving signal.

Scan and data circuit board assemblies of the light emission panel 20 are located on a rear surface of the surface heat generation unit 50 and respectively connected to driving IC packages 641 and 661. In order to drive the light emission panel 20, the scan circuit board assembly transmits a scan driving signal and the data circuit board assembly transmits a data driving signal. Either the cathode electrodes 32 or the gate electrodes 34 are applied with the scan driving signal and the other of the cathode electrode 32 or gate electrodes 34 are applied with a data driving signal.

When an image is displayed on the first pixel group, the corresponding second pixel of the light emission panel 20 emits light with a gray level (that may be predetermined) by synchronizing with the first pixel group. As described above, the light emission panel 20 controls independently a light emission intensity of each pixel and thus provides a proper intensity of light to the corresponding pixels of the display panel 70. As a result, the display device 100 of the present exemplary embodiment can enhance the contrast ratio of the screen, thereby improving the display quality.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A light emission device comprising:
   a first substrate;
   a second substrate facing the first substrate;
   an electron emission unit on a first surface of the first substrate facing the second substrate and comprising electron emission regions and driving electrodes;
   a light emission unit on a surface of the second substrate facing the first substrate and comprising an anode electrode and at least one phosphor layer; and
   a surface heat generation unit on a second surface of the first substrate facing away from the second substrate and adapted to control a temperature of the first substrate by using a resistive layer having a Positive Temperature Coefficient (PTC) property.

2. The light emission device of claim 1, wherein the surface heat generation unit comprises:
   a case comprising an upper plate, a lower plate, and a side plate;
   a positive lead line and a negative lead line, the positive and negative lead lines being located on at least one of a surface of the upper plate facing the lower plate or a surface of the lower plate facing the upper plate; and
   a PTC resistive layer located in the case.

3. The light emission device of claim 2, wherein the upper plate contacts the first substrate and is a metal plate.

4. The light emission device of claim 2, wherein the lower plate and the side plate comprise an ductile insulation material.

5. The light emission device of claim 2, wherein the positive and negative lead lines are located between the driving electrodes in a parallel manner.

6. The light emission device of claim 5, wherein the positive lead line includes first lead lines arranged in parallel with each other and second lead lines extending perpendicularly from the first lead lines;
   the negative lead line includes third lead lines arranged in parallel with each other and fourth lead lines extending perpendicularly from the third lead lines;
   the first and third lead lines are alternately arranged in a first direction of the first substrate; and
   the second and fourth lead lines are alternately arranged in a second direction of the first substrate.

7. The light emission device of claim 2, wherein the surface heat generation unit further comprises:
   a temperature detecting portion for detecting temperatures of the first and second substrates; and
   a control portion for applying voltages to the positive and negative lead lines in accordance with temperature information of the temperature detecting portion.

8. The light emission device of claim 2, wherein the PTC resistive layer has a varying thickness depending on a position thereof.

9. The light emission device of claim 8, wherein the thickness of the PTC resistive layer varies along a length extending in a direction parallel with one of the driving electrodes.

10. The light emission device of claim 8, wherein the thickness of the PTC resistive layer varies from a central portion of the first substrate to a peripheral portion of the first substrate.

11. The light emission device of claim 1, wherein the driving electrodes include cathode electrodes and gate electrodes crossing the cathode electrodes with an insulation layer interposed between the cathode electrodes and the gate electrodes; and
    the electron emission regions are electrically connected to the cathode electrodes.

12. The light emission device of claim 11, wherein the phosphor layers include red, green, and blue phosphor layers spaced apart from each other; and
    wherein the light emission unit further includes a black layer located between the phosphor layers.

13. The light emission device of claim 11, wherein the phosphor layer emits white light.

14. A display device comprising:
    a display panel for displaying an image; and
    a light emission device for emitting light toward the display panel,
    wherein the light emission device comprises:
      a first substrate;
      a second substrate facing the first substrate;
      an electron emission unit on a first surface of the first substrate facing the second substrate and comprising electron emission regions and driving electrodes;
      a light emission unit on a surface of the second substrate facing the first substrate and comprising an anode electrode and at least one phosphor layer; and
      a surface heat generation unit on a second surface of the first substrate facing away from the second substrate and adapted to control a temperature of the first substrate by using a resistive layer having a Positive Temperature Coefficient (PTC) property.

15. The display device of claim 14, wherein the surface heat generation unit comprises:
    a case comprising an upper plate, a lower plate, and a side plate;
    a positive lead line and a negative lead line, the positive and negative lead lines being located on at least one of a surface of the upper plate facing the lower plate or a surface of the lower plate facing the upper plate; and
    a PTC resistive layer located in the case.

16. The display device of claim 15, wherein the upper plate contacts the first substrate and is a metal plate; and
    the lower plate and the side plate comprise a ductile insulation material.

17. The display device of claim 15, wherein the positive and negative lead lines are located between the driving electrodes in a parallel manner.

18. The display device of claim 15, wherein the PTC resistive layer has a varying thickness depending on a position thereof 19. The display device of claim 15, wherein the display panel has first pixels and the light emission device has second pixels, the second pixels being less in number than that of the first pixels and an intensity of a light emission of each of the second pixels being independently controlled.

20. The display device of claim 14, wherein the display panel is a liquid crystal panel.

* * * * *

UNITED STATES PATENT AND TRADEMARK OFFICE
CERTIFICATE OF CORRECTION

PATENT NO. : 7,728,494 B2
APPLICATION NO. : 11/843563
DATED : June 1, 2010
INVENTOR(S) : Sang-Hun Park It is certified that error appears in the above-identified patent and that said Letters Patent is hereby corrected as shown below:

In the Claims

Column 11, Claim 4, line 34        Delete "an" Insert -- a --

Column 12, Claim 18, line 55       After "thereof" Insert -- . --

Signed and Sealed this
Twenty-second Day of November, 2011

David J. Kappos
*Director of the United States Patent and Trademark Office*